US011910307B2

(12) United States Patent
Brown

(10) Patent No.: US 11,910,307 B2
(45) Date of Patent: Feb. 20, 2024

(54) SYSTEMS, METHODS AND APPARATUSES FOR 3G TO VOLTE ROAMING

(71) Applicant: Jacob Brown, Green Bay, WI (US)

(72) Inventor: Jacob Brown, Green Bay, WI (US)

( * ) Notice: Subject to any disclaimer, the term of this patent is extended or adjusted under 35 U.S.C. 154(b) by 155 days.

(21) Appl. No.: 17/736,770

(22) Filed: May 4, 2022

(65) Prior Publication Data

US 2023/0362799 A1 Nov. 9, 2023

(51) Int. Cl.
*H04W 48/18* (2009.01)
*H04L 65/1016* (2022.01)
*H04W 36/00* (2009.01)
*H04L 65/1104* (2022.01)
*H04W 4/24* (2018.01)
*H04W 80/10* (2009.01)
*H04W 84/04* (2009.01)
*H04W 88/16* (2009.01)

(52) U.S. Cl.
CPC ......... *H04W 48/18* (2013.01); *H04L 65/1016* (2013.01); *H04L 65/1104* (2022.05); *H04W 4/24* (2013.01); *H04W 36/0022* (2013.01); *H04W 80/10* (2013.01); *H04W 84/042* (2013.01); *H04W 88/16* (2013.01)

(58) Field of Classification Search
CPC ..... H04W 76/15; H04W 76/16; H04W 76/18; H04W 76/19; H04W 76/20; H04W 76/27; H04W 48/18; H04W 4/24; H04W 36/0022; H04W 80/10; H04W 84/042; H04W 88/16; H04L 65/1016; H04L 65/1104
USPC ......................................... 370/329
See application file for complete search history.

(56) References Cited

U.S. PATENT DOCUMENTS

| | | | |
|---|---|---|---|
| 9,118,508 B2 * | 8/2015 | Bouthemy | .............. H04L 12/66 |
| 11,070,596 B1 * | 7/2021 | Yau | ...................... H04L 65/1069 |
| 2017/0156043 A1 * | 6/2017 | Li | .......................... H04W 76/11 |

* cited by examiner

*Primary Examiner* — Huy C Ho
(74) *Attorney, Agent, or Firm* — Miller IP Law; Devin Miller

(57) ABSTRACT

A 3G/LTE proxy system may enable LTE wireless communication by a UE roaming in an LTE VPMN but associated with a 3G carrier. The system may include an EPC configured to proxy as an LTE-capable HPMN for the UE as the UE is attached to a VPLMN. The system may include a 3G MSC configured to proxy as a 3G-capable VPMN for the HPMN. The system may include a translator. The translator may be configured to translate a data communication from an LTE data standard to a 3G data standard, and vice versa. The translator may be configured to translate a text communication from an LTE text standard to a 3G text standard, and vice versa. The translator may be configured to translate a voice communication from an LTE voice standard to a 3G voice standard, and vice versa.

20 Claims, 9 Drawing Sheets

SYSTEMS, METHODS AND APPARATUSES FOR 3G TO VOLTE ROAMING

BACKGROUND

Mobile communication may be accomplished by a network of systems, apparatuses, and devices interconnected according to various configurations. Such configurations may, for example, be defined by various protocols and systems that determine how information is stored and communicated. As communication technologies advance, the network may be upgraded with new hardware, protocols, and/or systems. However, other networks may not upgrade at a same time and/or same rate as the upgraded network. User equipment may be physically taken from a geographic region covered by one carrier to another region covered by a different carrier. The original carrier and the subsequent carrier may operate according to the same hardware, protocols, and/or systems, or different hardware, protocols, and/or systems.

BRIEF DESCRIPTION OF THE DRAWINGS

The present description will be understood more fully when viewed in conjunction with the accompanying drawings of various examples of systems, methods, and apparatuses for 3G to VoLTE roaming. The description is not meant to limit the systems, methods, and apparatuses for 3G to VoLTE roaming to the specific examples. Rather, the specific examples depicted and described are provided for explanation and understanding of systems, methods, and apparatuses for 3G to VoLTE roaming. Throughout the description the drawings may be referred to as drawings, figures, and/or FIGs.

DETAILED DESCRIPTION

Figure 1:
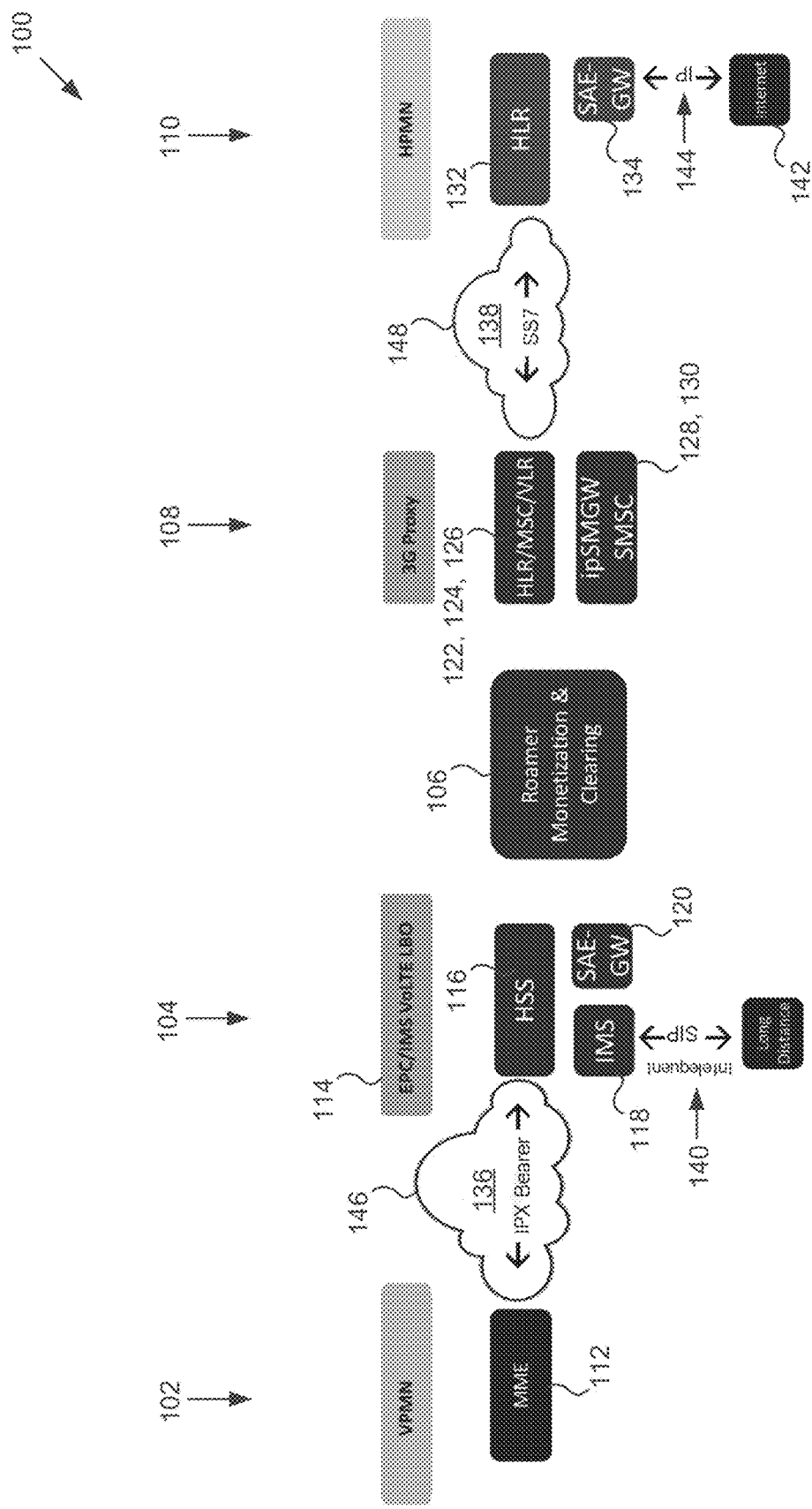
FIG. 1 illustrates a roaming system for a UE enabled for 3G and LTE communication, according to an implementation.

Systems, methods, and apparatuses for 3G to VoLTE roaming as disclosed herein will become better understood through a review of the following detailed description in conjunction with the figures. The detailed description and figures provide merely examples of the various embodiments of systems, methods, and apparatuses for 3G to VoLTE roaming. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Mobile networking standards have evolved over time, improving communication quality and capability. A carrier may upgrade its infrastructure to keep up with the evolving standards. The upgrade may occur gradually, and a carrier may have multiple public land mobile networks (PLMNs) that operate according to different standards. A user equipment (UE) may be designed to communicate according to multiple standards that correspond to the various PLMNs of the carrier. Additionally, carriers that cover different regions may have PLMNs that operate according to the various standards. A UE that travels from its home PLMN (HPLMN) to a visited PLMN (VPLMN) may be configured according to standards for both the HPLMN and the VPLMN.

However, in some cases, the VPLMN may not be configured for communication according to the same standard as the HPLMN. For example, a carrier in one country operate according to a third-generation (3G) standard, and a carrier in another country may operate according to a long-term evolution (LTE) standard but not the 3G standard. A UE may be designed to communicate according to the 3G standard and the LTE standard. The UE may be associated with the 3G carrier, such as via a subscriber identity module (SIM). The UE may travel to a region covered by the LTE carrier. While the UE may be configured for LTE communication, the SIM may be configured for a 3G network. In order to use the UE, a user may have to obtain a new SIM configured for an LTE network.

Implementations of the systems, methods, and apparatuses for 3G to LTE roaming described herein below may address some or all of the problems described above. A system may enable LTE wireless communication by a UE that has a home public mobile network (HPMN) based on a 3G wireless communication standard. The system may include an evolved packet core (EPC) configured to proxy as an LTE-capable HPMN for the UE as the UE is attached to a VPLMN. The system may include a 3G mobile switching center (MSC) configured to proxy as a 3G-capable visited public mobile network (VPMN) for the HPMN. The system may include a translator. The translator may be configured to translate a data communication from an LTE data standard at the EPC to a 3G data standard at the MSC, and vice versa. The translator may be configured to translate a text communication from an LTE text standard at the EPC to a 3G text standard at the MSC, and vice versa. The translator may be configured to translate a voice communication from an LTE voice standard at the EPC to a 3G voice standard at the MSC, and vice versa.

The system may enable roaming partners to continue roaming event when one carrier does not keep up with evolving technology and/or infrastructure enhancements. The system may, for example, enable a carrier to roam with voice over LTE (VoLTE) even if the carrier does not have an internet protocol (IP) multimedia subsystem (IMS) in the carrier's home network. Additionally, the system may enable monetization of roaming between networks configured for different communications standards. Additionally, the system and methods described herein may obviate the need for direct partnership between two carriers on different standards. Rather, the system and methods are rapidly deployable for any carrier without carriers needing adjust their network technologies or programming.

FIG. 1 illustrates a roaming system 100 for a UE enabled for 3G and LTE communication, according to an implementation. The roaming system 100 may enable roaming between carriers configured for different communications standards. The roaming system 100 may further enable monetization of roaming between the carriers.

The roaming system 100 may include a VPMN 102, an LTE proxy 104, a monetization clearinghouse 106, a 3G proxy 108, and an HPMN 110. The VPMN may include a mobility management entity (MME) 112. The LTE proxy 104 may include an evolved packet core (EPC) and IMS 114, a home subscriber server (HSS) 116, a long-distance IMS 118, and a system architecture evolution gateway (SAE-GW). The 3G proxy may include a proxy home location register (HLR) 122, a proxy mobile switching center (MSC) 124, a proxy visited location register (VLR) 126, an IP short message gateway (ipSMGW) 128, and a short message service center (SMSC) 130. The HPMN 110 may include an HLR 132, and an internet SAE-GW 134.

The MME 112 may communicate with the HSS 116 using an IP exchange (IPX) bearer 136. The proxy HLR 122, proxy MSC 124, and/or the proxy VLR 126 may communicate with the HLR 132 using a signaling system number seven (SS7) protocol 138. The long-distance IMS 118 may communicate long-distance using a session initiation protocol (SIP) 140. The internet SAE-GW 134 may communicate with the internet 142 over IP 144. In various implementations, a first communications intermediary 146 may facilitate communication between the MME 112 and the HSS 116. The intermediary may, for example, establish an inter-public land mobile network (InterPLMN) IP between the VPMN and the translator module. A second communications intermediary 148 may facilitate communication between the proxy MSC 124 and the HLR 132. The intermediary may, for example, establish a signaling system seven (SS7) screening protocol between the HPMN and the translator module.

The roaming system 100 may enable LTE wireless communication by a UE that has an HPMN based on a 3G wireless communication standard. The EPC/IMS 114 may be configured to proxy as an LTE-capable HPMN for the UE as the UE is attached to a VPLMN. The proxy HLR 122, the proxy MSC 124, and/or the proxy VLR 126 may be configured to proxy as a 3G-capable visited public mobile network (VPMN) for the HPMN. The LTE proxy 104 and the 3G proxy 108 may work in concert as a translator module that translates between LTE and 3G standards. The LTE proxy 104 may be the translator module. The 3G poxy 108 may be the translator module.

The LTE proxy 104 and/or the 3G proxy 108 may be configured to translate a data communication from an LTE data standard at the EPC/IMS 114 to a 3G data standard at the proxy MSC 124, and/or the proxy VLR 126. The LTE proxy 104 and/or the 3G proxy 108 may be configured to translate a data communication from a 3G standard at the proxy MSC 124 to an LTE standard at the EPC/IMS 114. The LTE proxy 104 and/or the 3G proxy 108 may be configured to translate a text communication from an LTE text standard at the EPC/IMS 114 to a 3G text standard at the proxy MSC 124. The LTE proxy 104 and/or the 3G proxy 108 may be configured to translate a text communication from a 3G text standard at the proxy MSC 124 to an LTE text standard at the EPC/IMS 114. The LTE proxy 104 and/or the 3G proxy 108 may be configured to translate a voice communication from an LTE voice standard at the EPC/IMS 114 to a 3G voice standard at the proxy MSC 124. The LTE proxy 104 and/or the 3G proxy 108 may be configured to translate a voice communication from a 3G voice standard at the proxy MSC 124 to an LTE voice standard at the EPC/IMS 114.

The LTE proxy 104 and/or the 3G proxy 108 may be further configured to establish an electronic subscriber identity module (eSIM) for the UE. The eSIM may enable the EPC/IMS 114 to handle LTE communications from the UE. A configuration of the eSIM may be based on subscriber data for the UE obtained from the HLR 132 of the HPMN 110. The eSIM may accordingly enable the translator module to translate an LTE communication from the UE to a 3G communication recognizable by an element of the HPMN. The LTE communication may be authorized by the VPMN 102 via the eSIM. The 3G communication may be authorized by the HPMN 110 via an HPMN SIM associated with the UE. To the HPMN 110, communication with the UE and the VPMN may appear to be 3G. To the VPMN, communication with the UE and the HPMN may appear to be LTE.

In various implementations, the translator module may have a unique access point name (APN) for the EPC/IMS 114. The HPMN 110 may include a domain name server (DNS). The DNS may store the APN for the IMS. The APN may enable the translator module to have the appearance of a 3G carrier to the HPMN 110. In various implementations, the translator module may have the appearance of a circuit-switched fallback (CSFB) to the HPMN 110. In general, data communication may look like a 3G data communication to the HPMN 110 and an LTE data communication to the VPMN 102. Text communication may look like a 3G text communication to the HPMN 110 and an LTE text communication to the VPMN 102. Voice communication may look like a 3G voice communication to the HPMN 110 and an LTE voice communication to the VPMN 102.

Figure 2:
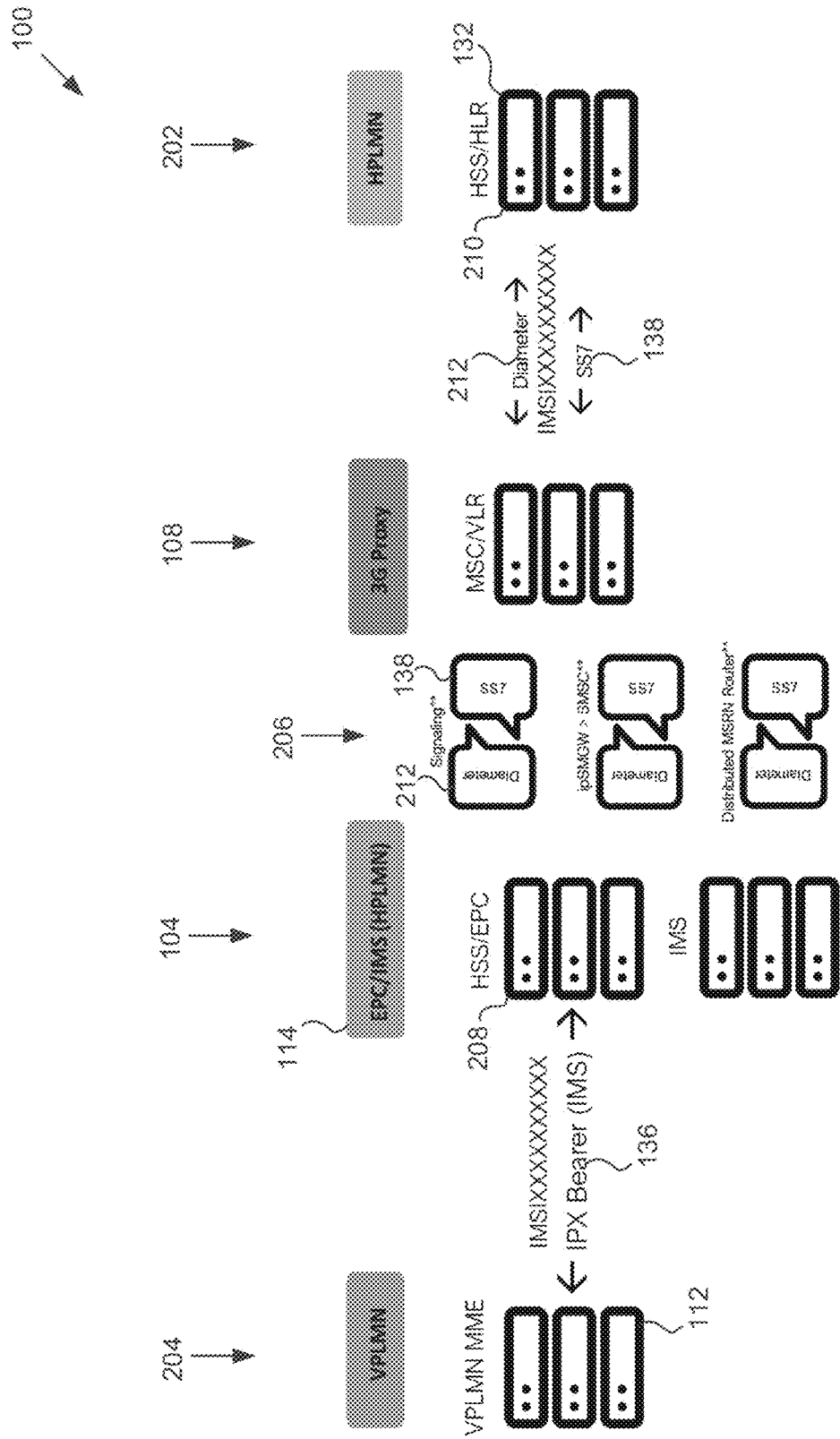
FIG. 2 illustrates device registration in the roaming system, according to an embodiment.

FIG. 2 illustrates device registration in the roaming system 100, according to an embodiment. An HPLMN 202 may be enabled for LTE communication and may have a 3G fallback. The roaming system 100 may enable communication between a VPLMN 204 and the HPLMN 202 via LTE or the 3G fallback. The VPLMN 204 may think it is talking to an LTE HPLMN and the HPLMN 202, in 3G fallback, may think it is talking to a 3G VPLMN (the terms think and talking to are metaphorical for the behavior of the respective elements). A translator 206 may translate voice, text, and data communications between the proxy systems to enable such behavior.

The HPLMN 202 may include an IMS with a first HSS 208. The 3G fallback of the HPLMN 202 may be enabled at least in part by implementation of the HLR 132 in the HPLMN 202. The first HSS 208 may be mirrored in the LTE proxy 104 by a second HSS 210. During LTE-based communications with the HPLMN 202, communications may be authorized and enabled according to LTE standards for roaming. When the LTE network of the HPLMN 202 is unavailable, roaming the translator 206 may enable LTE roaming of the UE.

The VPLMN 204 may include the MME 112. The MME 112 may transmit communications on the IPX bearer 136 to the EPC/IMS 114. The communications may be received by the second HSS 210, which may mirror the first HSS 208. The translator 206 may translate LTE signals to 3G signals, and vice versa, such as by translating between Diameter 212 and SS7 138. In 3G fallback, the HPLMN 202 may behave according to the 3G standard and may communicate with the 3G proxy 106 accordingly. The VPLMN 204 may behave according to the LTE standard and may communicate with the LTE proxy 104 accordingly. The translator 206 may translate between the LTE and 3G standards. For example, the translator 206 may be configured to translate signaling between Diameter 212 and SS7 138. The translator 206 may be configured to translate short message service (SMS) messages between an ipSMGW and a SMSC. The translator 206 may include a distributed mobile station roaming number (MSRN) router.

The UE may be registered in the VPLMN by attaching to the IMS 114. An attachment procedure initiation (API) may be sent to the MSC of the 3G proxy 108 to trigger a location update (LU) for the UE with the HPLMN 202. The MSC may obtain individual subscriber data (ISD) from the HLR of the HPLMN 202. The ISD may enable various features of the UE as it is attached to the VPLMN 204, such as caller ID, call forwarding, camel messaging, and so forth. The MSC may insert the ISD into an extensive markup language (XML) document management server (XDMS) associated with the IMS of the LTE proxy 104. This may enable the UE to communicate via the LTE standard of the VPLMN 204 per the ISD. Codes manually entered in the UE may enable updating of the XDMS and may be relayed to the HPMN of the UE using unstructured supplementary service data (USSD).

Figure 3:
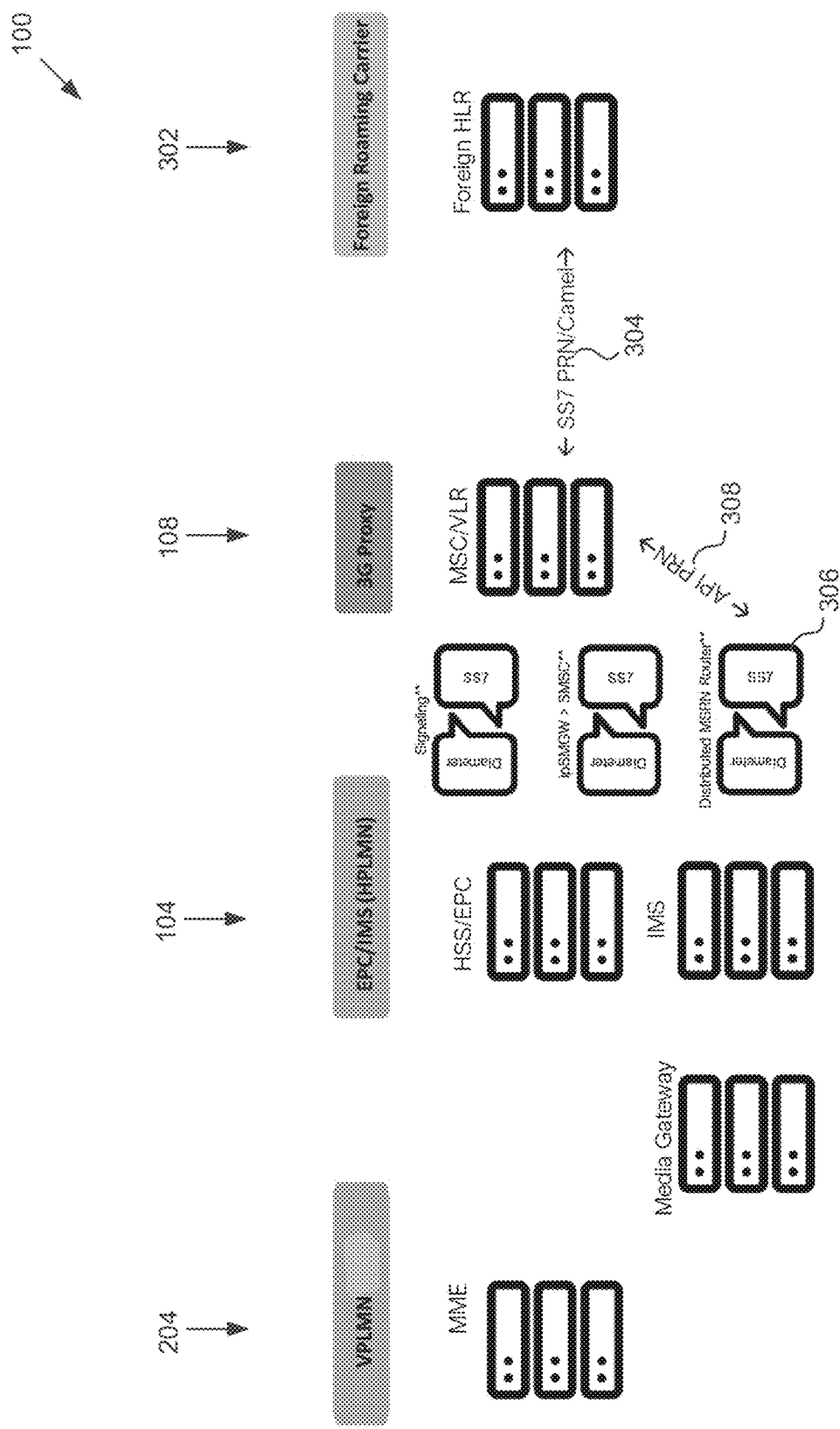
FIG. 3 illustrates handling of inbound calling in the roaming system, according to an implementation.

FIG. 3 illustrates handling of inbound calling in the roaming system 100, according to an implementation. The foreign carrier 302 may have a 3G fallback. The roaming system 100 may enable an LTE- and 3G-enabled UE with a foreign SIM to roam to the VPLMN 204 when the LTE capabilities of the foreign carrier 302 are unavailable. The foreign carrier 302 may think it is talking to a 3G network, and the VPLMN 204 may think it is talking to an LTE network.

Inbound call provide roaming number (PRN) and Camel messaging 304 may be relayed from an HLR of the foreign carrier 302 to the MSC of the 3G proxy 108. The MSC may obtain the MSRN for the UE via an MSRN relay 306. The MSRN relay 306 may communicate with the MSC of the 3G proxy 108 via an API PRN. The inbound call may accordingly be redirected to the MSRN relay 306. In some implementations, such as when Camel messaging is active for the foreign carrier 302, the MSC of the 3G proxy 108 may control voice communication via Camel messaging to media gateway API controls associated with and/or in communication with the VPLMN 204.

Figure 4:
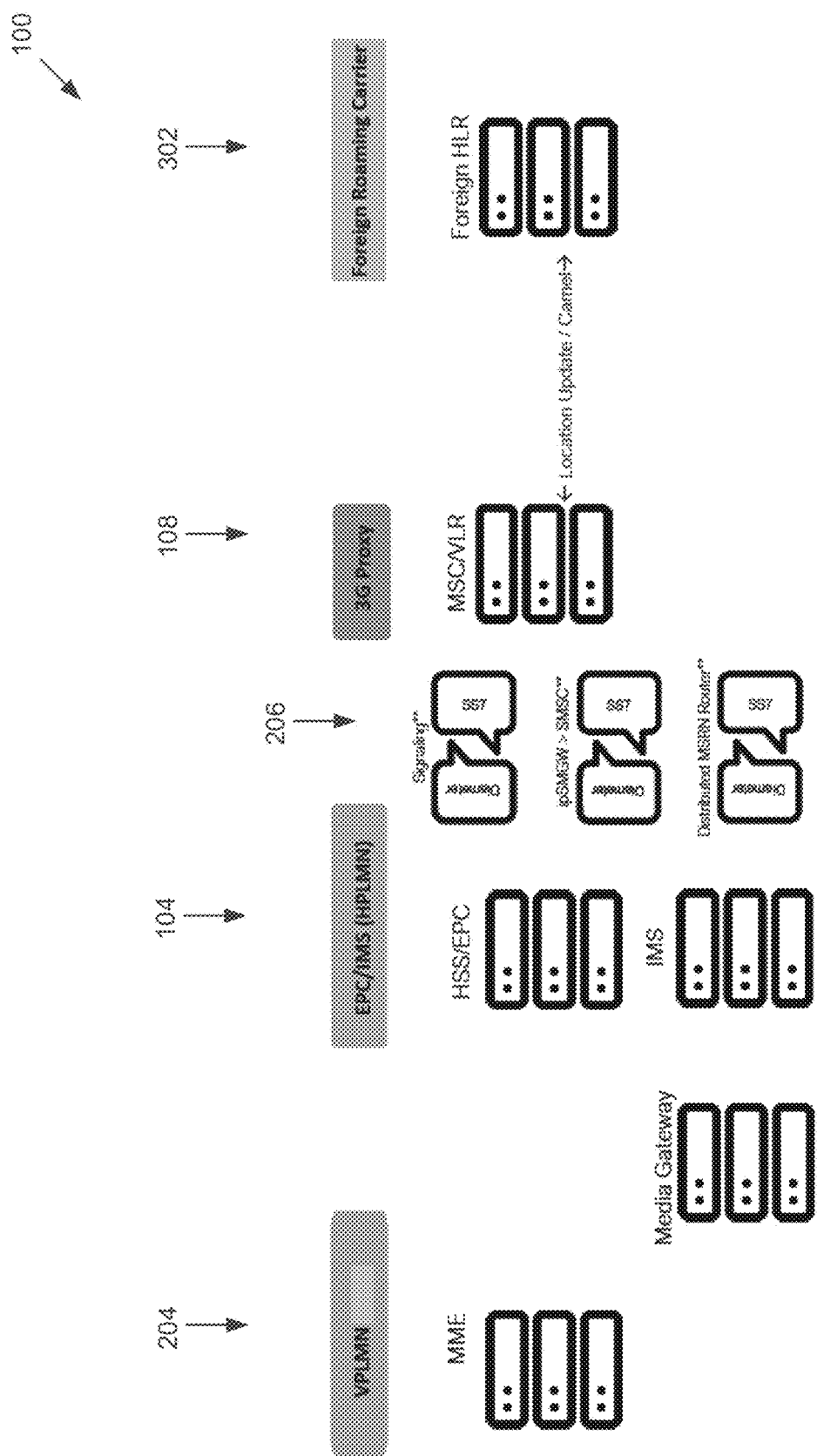
FIG. 4 illustrates outbound call handing in the roaming system, according to an implementation.

FIG. 4 illustrates outbound call handing in the roaming system 100, according to an implementation. The translator 206 may enable LTE-to-3G translation for an LTE-enabled UE with a 3G carrier where the UE roams to an LTE VPLMN. The HPLMN may think that it is handling the call according to 3G standards, and the VPLMN may think it is handling the call according to LTE standards.

During registration of the UE with the VPLMN, the MSC of the 3G proxy may flag outbound calls from and/or inbound calls to the UE for monitoring. For example, this may be done when Camel messaging is active. A mobile-originated (MO) call from the UE may be directed from the VPLMN 204 to the LTE proxy 104, may be translated by the translator 306, and further routed through the MSC of the 3G proxy 108. The MSC may control various characteristics of the call based on Camel messaging.

Figure 5:
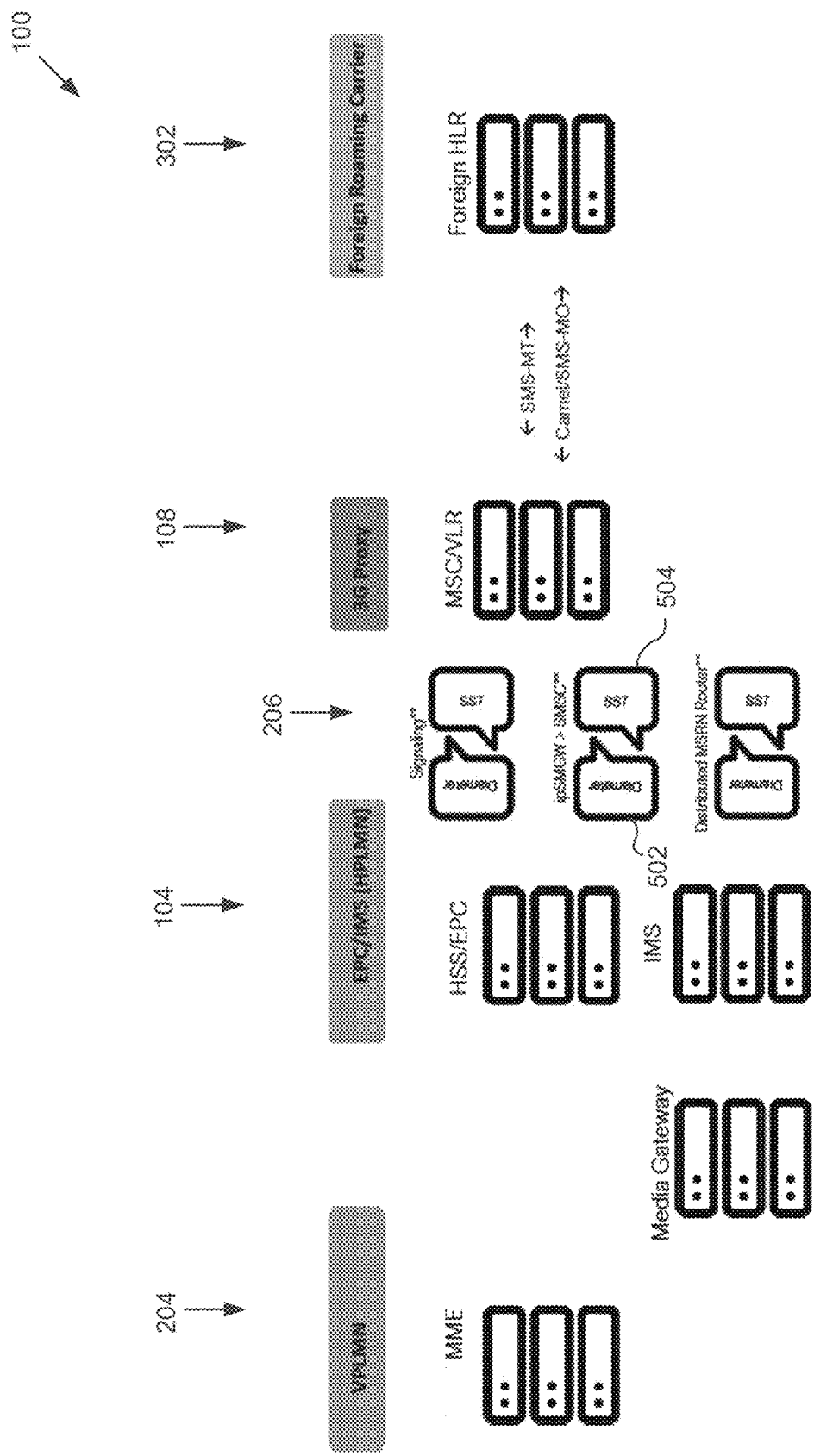
FIG. 5 illustrates outbound and inbound message handling in the roaming system, according to an implementation.

FIG. 5 illustrates outbound and inbound message handling in the roaming system 100, according to an implementation. The translator 206 may enable conversion of SIP to SS7 so that outbound messages may be handled by the 3G proxy 108. This may, in turn, enable communication with another UE attached to the foreign carrier 302 according to 3G standards, where the foreign carrier 302 thinks the messaging is originated from another 3G network.

An MO SMS message may be sent from the UE to the MME of the VPLMN 204 according to a SIP protocol. The SMS message may be forwarded to the IMS of the LTE proxy 104. In turn, the SMS message may be forwarded to the ipSMGW 502 of the translator 506. The ipSMGW may convert the SMS message from SIP to SS7 and forward the SMS message to the MSC of the 3G proxy 108. The MSC may perform Camel messaging with the HLR of the foreign carrier 302 and then forward the SMS message to an SMSC gateway (GT) for further handling and forwarding to the UE to which the SMS message is addressed.

A mobile terminated (MT) SMS message may be sent to the UE attached to the VLPMN 204, but with a 3G carrier. The SMS message may originally be routed through the HPLMN of the foreign carrier 302. The MSC of the 3G proxy 108 may receive the SMS message and forward the SMS message to an SMSC 504 of the translator 206. The SMSC may convert the SMS message from SS7 to SIP and forward the SMS message to the ipSMGW 502 for further processing. The ipSMGW may be forwarded to the IMS of the LTE proxy 104, which may further handle delivering the SMS message to the UE via the VPLMN 204.

Figure 6:
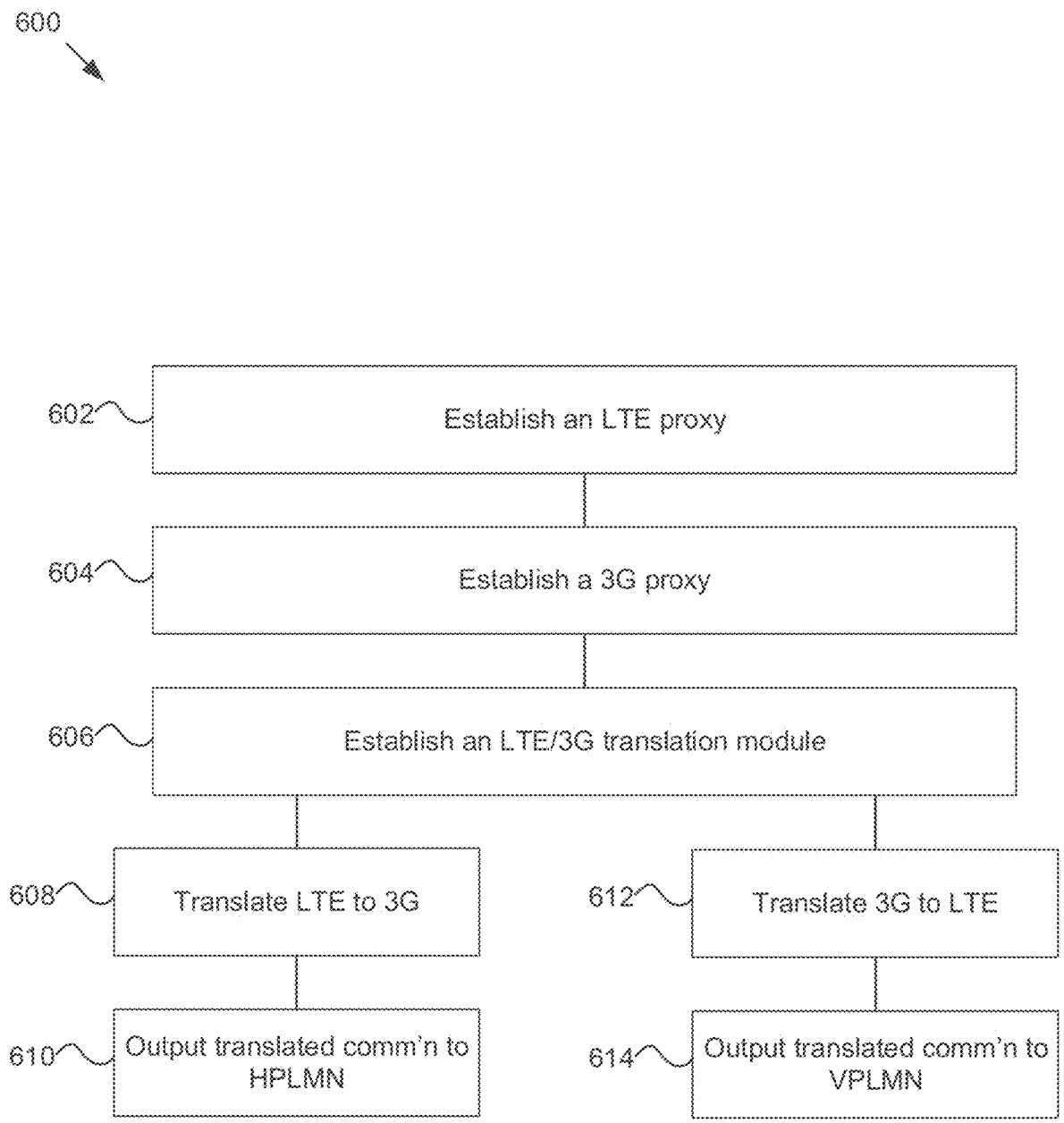
FIG. 6 illustrates a method of establishing a 3G/LTE proxy system, according to an implementation.

FIG. 6 illustrates a method 600 of establishing a 3G/LTE proxy system, according to an implementation. The method 600 may, for example, be implemented in the roaming system 100 to enable attachment of an LTE-enabled UE with a 3G carrier to an LTE VPLMN. The VPLMN may think it is talking to an LTE network and the HPLMN of the 3G carrier may think it is talking to a 3G network.

The method 600 may include establishing an LTE proxy for a 3G HPMN (block 602). As used herein, the term establish may refer to setup and/or programming of hardware. The LTE proxy may include an EPC, an IMS, a media gateway, and HSS, and so forth. The method 600 may include establishing a 3G proxy for an LTE VPLMN (block 604). The 3G proxy may include an MSC, an HLR, a VLR, and so forth. The method 600 may include establishing a translation module (block 606). The translation module may be communicatively coupled to, for example, the EPC and/or the MSC. The translation module may be configured to translate a communication from an LTE standard to a 3G standard and vice versa. The communication may be a voice communication, an SMS communication, and/or signaling.

The method 600 may include translating, by the translation module, an LTE communication to a 3G communication (block 608). The LTE communication may be, for example, received by the EPC from the VPLMN. The method 600 may include outputting the translated communication to the HPLMN associated with the UE (block 610). For example, the translated communication may be output by the MPC to the HPLMN.

The method 600 may include translating 3G communication to an LTE communication (block 612). The 3G communication may, for example, be received by the MPC from the HPMN. The method 600 may include outputting the translated communication to the VPLMN to which the UE is attached (614). For example, the translated communication may be output by the EPC to the VPLMN.

One or more of the IMS, the HSS, and/or the media gateway may be elements of the EPC. The VPLMN may include an MME. The HSS of the LTE proxy may be accessible by the MME. The HSS may proxy as an HSS for the HPMN, albeit according to an LTE standard. The LTE communication may include an IP data packet. The LTE communications may, for example, be communicated via SIP. The LTE communications and/or the 3G communications may, for example, be effectuated under the Diameter protocol. The 3G communications may, for example, be communicated via SS7. The MSC of the 3G proxy may perform Camel messaging with the HPLMN. The translation module may maintain an internet bearer between the HPMN and the UE as the UE is roaming (i.e., is attached to the VPLMN).

Figure 7:
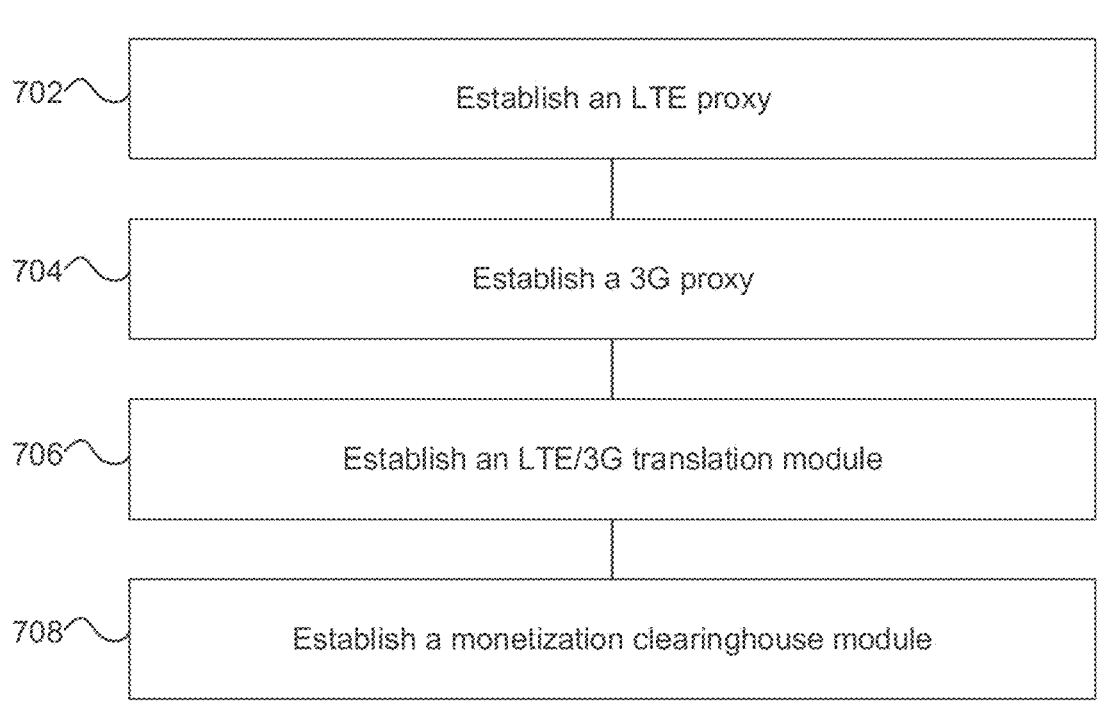
FIG. 7 illustrates a method of monetizing the 3G/LTE proxy system, according to an implementation.

FIG. 7 illustrates a method 700 of monetizing the 3G/LTE proxy system, according to an implementation. The proxy system may enable a roaming system to handle prepaid and/or postpaid service. The proxy system may, accordingly, enable a full suite of interoperability between 3G and LTE networks.

The method 700 may include establishing an LTE proxy for a 3G HPMN (block 702). The method 700 may include establishing a 3G proxy for an LTE VPLMN (block 704). The method 700 may include establishing a translation module (block 706). The method 700 may include establishing a monetization clearinghouse module (block 708). The monetization clearinghouse module may be configured to determine billing data for a UE roaming in a VPLMN. A home network of the UE may be operated by a 3G carrier. The monetization clearinghouse module may be configured for clearing prepaid mobile service for the UE and postpaid mobile service for the UE.

Figure 8:
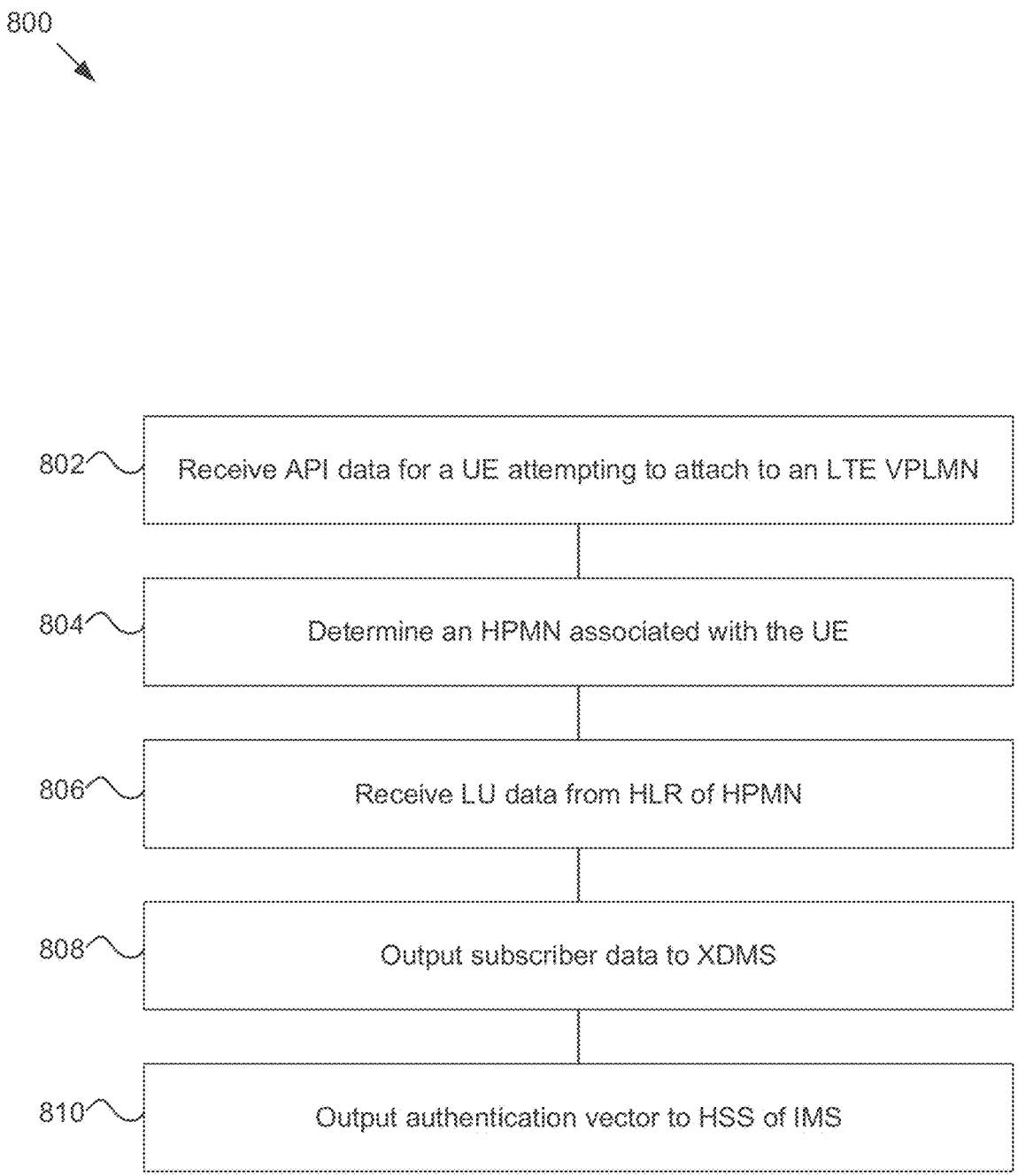
FIG. 8 illustrates a method of communication between a UE roaming in a VPLMN and an HPMN associated with the UE, according to an implementation.

FIG. 8 illustrates a method 800 of communication between a UE roaming in a VPLMN and an HPMN associated with the UE, according to an implementation. In various implementations, the method 800 may enable attachment of the UE to the VPLMN. The method 800 may be executed such that the VPLMN thinks it is talking to an LTE network and the HPMN thinks it is talking to a 3G network.

The method 800 may include receiving, from an IMS, API data indicative of a request from a UE to attach to a VPLMN (block 802). The UE may be configured for VoLTE wireless communication. The UE may additionally be configured for 3G wireless communication. The VPMN may be based on an LTE standard. The method 800 may include determining, based on the API data, an HPMN associated with the UE (block 804). The HPMN may be based on a 3G standard.

The method 800 may include outputting notification data to an HLR of the HPMN (block 804). The notification data may indicate the UE is requesting to attach to the VPLMN. The method 800 may include receiving, from the HLR, LU data (block 806). The LU data may be indicative of subscriber data associated with the UE. The LU data may be indicative of an authentication vector for the UE. The method 800 may include outputting the subscriber data to an XDMS associated with the IMS such that the subscriber data is associated with the UE in the XDMS (block 808). The method 800 may include outputting the authentication vector to an HSS associated with the IMS (block 810).

Figure 9:
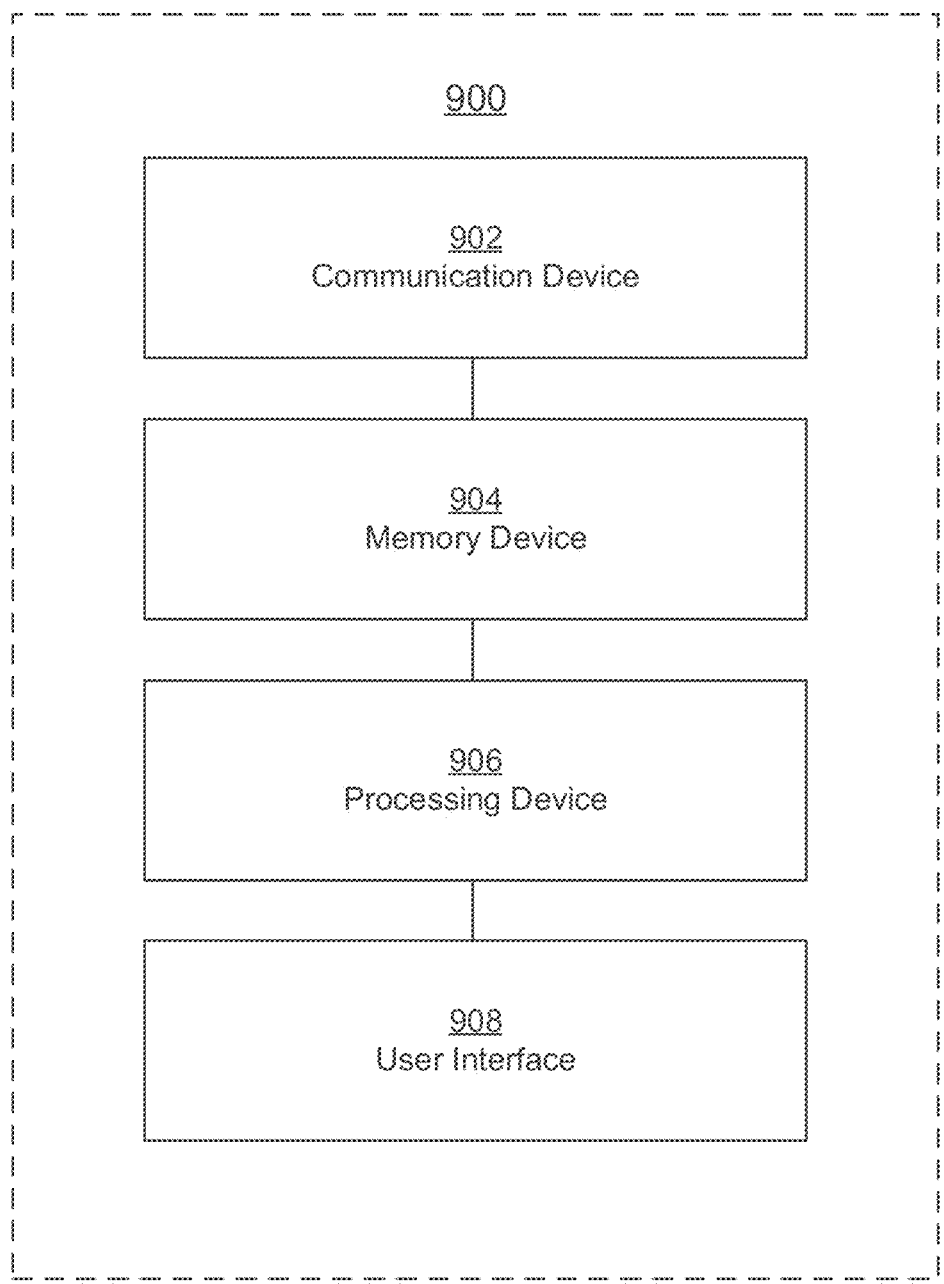
FIG. 9 illustrates a schematic of an example proxy server, according to an implementation.

FIG. 9 illustrates a schematic of an example proxy server 900, according to an implementation. The proxy server may be a 3G proxy that allows a 3G carrier to think it is communicating according to a 3G standard when, in reality, the UE is attached to an LTE VPLMN. This may enhance interoperability of networks on different standards. Additionally, this may enable roaming from 3G mobile network operators (MNOs) to LTE MNOs as the LTE MNOs turn down their 3G capabilities.

The proxy server 900 may include a communication device 902, a memory device 904, a processing device 906, and/or a user interface 908. The user interface 908 may enable interaction by, for example, a user monitoring the proxy server to adjust the programming and/or hardware of the proxy server 900. The proxy server 900 may be a private server. The proxy server 900 may be web-based (i.e., may be implemented on a server accessible via the internet).

The processing device 906 may have volatile and/or persistent memory. The memory device 904 may have volatile and/or persistent memory. The processing device 906 may have volatile memory and the memory device 904 may have persistent memory.

The processing device 906 may generate an output based on an input. For example, the processing device 906 may receive an electronic and/or digital signal. The processing device 906 may read the signal and perform one or more tasks with the signal, such as performing various functions with data in response to input received by the processing device. The processing device 906 may read from the memory device 904 information needed to perform the functions. The processing device 906 may send an output signal to the memory device 904, and the memory device 904 may store data according to the signal output by the processing device 906.

The processing device 906 may be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically to refer to any or all of the aforementioned specific devices, elements, and/or features of the processing device.

The memory device 904 may be and/or include a computer processing unit register, a cache memory, a magnetic disk, an optical disk, a solid-state drive, and so forth. The memory device 904 may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

The communication 902 device may include, for example, a networking chip, one or more antennas, and/or one or more communication ports. The communication device may generate radio frequency (RF) signals and transmit the RF signals via one or more of the antennas. The communication device 902 may receive and/or translate the RF signals. The communication device 902 may transceive the RF signals. The RF signals may be broadcast and/or received by the antennas.

The communication device 902 may generate electronic signals and transmit the RF signals via one or more of the communication ports. The communication device 902 may receive the RF signals from one or more of the communication ports. The electronic signals may be transmitted to and/or from a communication hardline by the communication ports. The communication device 902 may generate optical signals and transmit the optical signals to one or more of the communication ports. The communication device 902 may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device 902 may include hardware and/or software for generating and communicating signals over a direct and/or indirect network communication link. For example, the communication device 902 may include a USB port and a USB wire, and/or an RF antenna with Bluetooth™ programming installed on a processor, such as the processing component, coupled to the antenna. In another example, the communication device 902 may include an RF antenna and programming installed on a processor, such as the processing device 906, for communicating over a Wifi and/or cellular network. As used herein, "communication device" "communication component," and/or "communication unit" may be used generically herein to refer to any or all of the aforementioned elements and/or features of the communication component.

The proxy server 900 may include a physical server and/or a virtual server. For example, the proxy server 900 may include one or more bare-metal servers. The bare-metal servers may be single-tenant servers or multiple tenant servers. In another example, the proxy server 900 may include a bare metal server partitioned into two or more virtual servers. The virtual servers may include separate operating systems and/or applications from each other. In yet another example, the proxy server 900 may include a virtual server distributed on a cluster of networked physical servers. The virtual servers may include an operating system and/or one or more applications installed on the virtual server and distributed across the cluster of networked physical servers. In yet another example, the proxy server 900 may include more than one virtual server distributed across a cluster of networked physical servers.

The term server may refer to functionality of a device and/or an application operating on a device. For example, an application server may be programming instantiated in an operating system installed on a memory device and run by a processing device. The application server may include instructions for receiving, retrieving, storing, outputting, and/or processing data. A processing server may be programming instantiated in an operating system that receives data, applies rules to data, makes inferences about the data, and so forth. Servers referred to separately herein may be instantiated in the same operating system and/or on the same server device. Separate servers may be instantiated in the same application or in different applications.

Various aspects of the systems described herein may be referred to as "data." Data may be used to refer generically to modes of storing and/or conveying information. Accordingly, data may refer to textual entries in a table of a database. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer-readable. Data may refer to human-readable text.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is"

regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

The invention claimed is:

1. A method, comprising:
receiving, from an internet protocol (IP) multimedia subsystem (IMS), attachment procedure initiation (API) data indicative of a request from a user equipment (UE) to attach to a visited public land mobile network (VPLMN), wherein:
  the UE is configured for:
    voice over long term evolution (VoLTE) wireless communication; and
    third-generation (3G) wireless communication; and
  the VPLMN is based on an LTE standard;
determining, based on the API data, a home public mobile network (HPMN) associated with the UE, wherein the HPMN is based on a 3G standard;
outputting notification data to a home location register (HLR) of the HPMN, wherein the notification data indicates the UE is requesting to attach to the VPLMN;
receiving, from the HLR, location update data indicative of:
  subscriber data associated with the UE; and
  an authentication vector for the UE;
outputting the subscriber data to an extensive markup language (XML) document management server (XDMS) associated with the IMS such that the subscriber data is associated with the UE in the XDMS; and
outputting the authentication vector to a home subscriber server (HSS) associated with the IMS.

2. The method of claim 1, further comprising establishing an IP exchange (IPX) bearer between a mobility management entity of the VPLMN and an LTE proxy for the HPMN, and wherein communication with the HPMN occurs according to a signaling system number seven (SS7) protocol or a Diameter protocol.

3. A method, comprising:
establishing a long-term evolution (LTE) proxy for a third-generation (3G) home public mobile network (HPMN), wherein the LTE proxy comprises an evolved packet core (EPC);
establishing a 3G proxy for an LTE visited public land mobile network (VPLMN), wherein the 3G proxy comprises a mobile switching center (MSC);
establishing a translation module communicatively coupled to the EPC and the MSC, wherein the translation module is configured to translate a communication from an LTE standard to a 3G standard and vice versa; and
translating, by the translation module:
  a first LTE communication to a first 3G communication, wherein the first LTE communication is:
    received by the EPC from the VPLMN; and
    output by the MSC to the HPMN; or
  a second 3G communication to a second LTE communication, wherein the second 3G communication is:
    received by the MSC from the HPMN; and,
    output by the EPC to the VPLMN.

4. The method of claim 3, wherein the EPC comprises an internet protocol (IP) multimedia subsystem (IMS).

5. The method of claim 3, wherein:
the EPC comprises a home subscriber server (HSS) accessible by a mobility management entity (MME) of the VPLMN; and
the HSS of the EPC proxies as an HSS for the HPMN.

6. The method of claim 3, wherein the first LTE communication or the second LTE communication comprises an IP data packet.

7. The method of claim 3, wherein the first LTE communication or the second LTE communication comprises a session initiation protocol (SIP).

8. The method of claim 3, wherein the 3G proxy further comprises a proxy visitor location register (VLR) for the VPLMN.

9. The method of claim 3, wherein the first 3G communication or the second 3G communication is communicated based on a signaling system number seven protocol (SS7).

10. The method of claim 3, further comprising establishing a monetization clearinghouse module configured to determine billing data for a user equipment (UE) roaming in the VPLMN, wherein a home network of the UE is the HPMN.

11. The method of claim 10, wherein the monetization clearinghouse module is further configured for clearing prepaid mobile service for the UE and postpaid mobile service for the UE.

12. The method of claim 3, wherein the translation module is further configured to maintain an internet bearer between the HPMN and a user equipment (UE) as the UE roams to the VPLMN.

13. A system that enables long term evolution (LTE) wireless communication by a user equipment (UE) that has a home public mobile network (HPMN) based on a third-generation (3G) wireless communication standard, the system comprising:
    an evolved packet core (EPC) configured to proxy as an LTE-capable HPMN for the UE as the UE is attached to a visited land public mobile network (VPLMN);
    a 3G mobile switching center (MSC) configured to proxy as a 3G-capable visited public mobile network (VPMN) for the HPMN; and
    a translator configured to translate:
        a data communication from an LTE data standard at the EPC to a 3G data standard at the MSC and vice versa;
        a text communication from an LTE text standard at the EPC to a 3G text standard at the MSC and vice versa; and
        a voice communication from an LTE voice standard at the EPC to a 3G voice standard at the MSC and vice versa.

14. The system of claim 13, wherein the translator is further configured to establish an electronic subscriber identity module (eSIM) for the UE, wherein the eSIM enables the translator to translate an LTE communication from the UE to a 3G communication recognizable by an element of the HPMN.

15. The system of claim 14, wherein:
    the LTE communication is authorized by the VPMN via the eSIM; and
    the 3G communication is authorized by the HPMN via an HPMN SIM associated with the UE.

16. The system of claim 13, wherein:
    the HPMN comprises a domain name server (DNS);
    the translator comprises an internet protocol multimedia subsystem (IMS); and
    the DNS stores access point name (APN) for the IMS.

17. The system of claim 13, further comprising a communications intermediary configured to establish a signaling system seven (SS7) screening protocol between the HPMN and the translator.

18. The system of claim 13, further comprising a communications intermediary configured to establish an inter-public land mobile network (InterPLMN) internet protocol (IP) between the VPMN and the translator.

19. The system of claim 13, wherein the translator appears to the HPMN as a circuit-switched fallback (CSFB).

20. The system of claim 13, wherein the data communication, the text communication, or the voice communication looks like a 3G communication to the HPMN and an LTE communication to the VPMN.

* * * * *